(12) United States Patent
Chopra et al.

(10) Patent No.: US 8,815,771 B2
(45) Date of Patent: Aug. 26, 2014

(54) MECHANOCHROMIC COATING COMPOSITION

(75) Inventors: Anu Chopra, Pittsburgh, PA (US); Jun Deng, Murrysville, PA (US); Charles R. Hickenboth, Cranberry Township, PA (US); Robin M. Peffer, Valencia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 197 days.

(21) Appl. No.: 13/447,604

(22) Filed: Apr. 16, 2012

(65) Prior Publication Data

US 2013/0269445 A1  Oct. 17, 2013

(51) Int. Cl.
*B41M 5/124* (2006.01)
*B41M 5/15* (2006.01)
*C09D 175/14* (2006.01)
*G03C 1/685* (2006.01)
*G01L 1/24* (2006.01)

(52) U.S. Cl.
CPC ............... *B41M 5/124* (2013.01); *B41M 5/15* (2013.01); *G01L 1/247* (2013.01); *G03C 1/685* (2013.01); *C09D 175/14* (2013.01)
USPC ............................................ 503/201; 73/762

(58) Field of Classification Search
USPC ............. 372/69–72, 34–36; 503/201; 73/762
See application file for complete search history.

(56) References Cited

U.S. PATENT DOCUMENTS

| 6,441,066 | B1 | 8/2002 | Woodworth et al. |
| 7,438,972 | B2 | 10/2008 | Faler et al. |
| 7,605,194 | B2 | 10/2009 | Ferencz et al. |
| 8,236,914 | B2 * | 8/2012 | Potisek et al. ............ 526/329.7 |
| 2006/0022176 | A1 | 2/2006 | Wang et al. |
| 2010/0206088 | A1 | 8/2010 | Potisek et al. |

FOREIGN PATENT DOCUMENTS

WO WO 01/55269 A1  8/2001
WO WO 2009/018111 A1  2/2009

OTHER PUBLICATIONS

Davis et al. "Force-induced activation of covalent bonds in mechanoresponsive polymeric materials", Nature, May 7, 2009, pp. 68-72, vol. 459.
Hickenboth et al. "Biasing reaction pathways with mechanical force", Nature, Mar. 22, 2007, pp. 423-427, vol. 446.
Kingsbury et al. "Shear activation of mechanophore-crosslinked polymers", J. Mater. Chem., 2011, pp. 8381-8388, vol. 21.
Kim et al. "A mechanochromic smart material", Polymer Bulletin, 1993, pp. 367-374, vol. 31.
Lee et al. "Force-Induced Redistribution of a Chemical Equilibrium", Journal of the American Chemical Society, Oct. 26, 2010, pp. 16107-16111, vol. 132.
Potisek et al. "Mechanophore-Linked Addition Polymers", Journal of the American Chemical Society, Oct. 24, 2007, pp. 13808-13809, vol. 129.

* cited by examiner

*Primary Examiner* — Bruce H Hess
(74) *Attorney, Agent, or Firm* — Julie W. Meder

(57) ABSTRACT

A mechanochromic coating composition is disclosed comprising a polymeric network incorporating a plurality of ring-opening mechanophores each bound at two positions thereof within said polymeric network.

16 Claims, No Drawings

MECHANOCHROMIC COATING COMPOSITION

BACKGROUND OF THE INVENTION

1. Field of the Invention

The present invention is directed to coating compositions having a polymeric network that incorporates a plurality of ring-opening mechanophores bound within the polymeric network.

2. Description of Related Art

Polymeric materials are often used to coat various structural components in many industries, such as aerospace components, medical devices, turbines (wind energy and manufacturing), and the like. These components may become damaged or stressed during use. Oftentimes, this damage or stress to the underlying structural component is not clearly visible. The structural components and the polymeric coating on these components are subjected to a variety of forces that impart elongation, compression, and shear stresses. These forces hasten the fatigue within the component and increase the risk of catastrophic failure of the component. Therefore, these components are routinely examined for structural integrity using visual and non-visual techniques, particularly when a sudden failure presents risk to equipment or human safety. This practice consumes valuable time and resources and hidden dangers are often difficult or impossible to detect. Thus, catastrophic failures can occur within such components with little or no warning.

The ability to detect damage as it occurs and locate the area of damage would be helpful. In particular, materials that self-report the state of damage and stress applied thereto are helpful in eliminating or minimizing the failure of the underlying structural component.

SUMMARY OF THE INVENTION

The present invention includes a mechanochromic coating composition that comprises a polymeric network incorporating a ring-opening mechanophore bound at at least two positions thereof within the polymeric network. Also included in the present invention is a method of making a mechanochromic coating composition including preparing a curable coating composition comprising polyurethane precursor components and a ring-opening mechanophore, and reacting the polyurethane precursor components and the mechanophore such that the mechanophore is bound at at least two locations thereof to the polyurethane precursors, thereby producing a polyurethane network having the mechanophore incorporated therein. The present invention is particularly useful in determining whether a mechanical load has been applied to an article by coating an article with the mechanochromic coating composition of the present invention and detecting a color change of the coating composition, where the color change indicates that the coating composition has been subjected to a mechanical load.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is meant to include homopolymer, copolymer, and oligomer. The term "metal" includes metals, metal oxides, and metalloids.

The present invention is directed to a mechanochromic coating composition having a polymeric network that incorporates a ring-opening mechanophore bound at at least two positions thereof within the polymeric network. By "polymeric network" it is meant a branched and/or crosslinked polymer, i.e. a non-linear polymer having more than a simple backbone structure.

By "mechanophore" it is meant a component having a ring structure that opens and exhibits a visible color change upon application of stress thereto. Such stress may include elongation or other mechanical disruption of the component. The mechanophore signals an area under stress by causing a color change in the material. This allows for damage detection via a color change of the material, thereby indicating that repair thereof prior to failure of the component is warranted. It has been found that certain photochromic dyes exhibit mechanochromism, depending at least in part the locations on the dye molecule that are connected to the polymeric network. In one embodiment of the invention, a mechanophore includes spirooxazine and/or indenonaphthopyran. In particular, it has been found that spirooxazine that is bound within the polymeric network at the C5 position of the indolene portion of the spirooxazine and the C5' position of the naphthalene portion of the spirooxazine provides a mechanochromic response when incorporated into a polymeric network. It has also been found that indenonaphthopyran that is bound to the polymeric network at the C7 and para positions of the indenonaphthopyran exhibits mechanochromism.

By "mechanochromic dye", "mechanochromic polyisocyanate", or the like, it is meant that the material (e.g., dye or polyisocyanate) includes a moiety that exhibits mechanochromism at least when incorporated into a polymeric network of the present invention. Such materials may also be referred to herein as "mechanophore functionalized" or "dye-based", also meaning that the material includes a moiety that exhibits mechanochromism at least when incorporated into a polymeric network of the present invention.

Incorporation of a mechanochromic dye in a polymeric network is achieved by functionalizing a dye with an initiator, which is then incorporated in a polymerization reaction. In one embodiment of the invention, a multi-step process is conducted to incorporate a mechanochromic dye into a polymeric network, such as an acrylic polyurethane network, by functionalizing a mechanochromic dye as a precursor component of the polyurethane network. For example, a polyisocyanate moiety incorporating a mechanochromic dye may be polymerized with a polyol to generate a polyurethane having mechanophores in the urethane linkages. The level or relative amount of mechanophores in the final polymeric network may be determined by controlling the molar ratio of the amount of polyisocyanate incorporating a mechanophore to the amount of polyisocyanate not incorporating a mechanophore. The ratio of mechanochromic polyisocyanate to non-mechanochromic polyisocyanate may be selected according to the end use, strength of the mechanochromic response, and other factors. In one embodiment, only mechanochromic polyisocyanate is used to produce mechanochromic polyurethane.

In one embodiment, a mechanochromic dye is functionalized with hydroxyl groups on at least two positions of the dye. The hydroxy-functional dye is then reacted with a halogen-functional acyl halide to produce a polymerization initiator, such as an atom transfer radical polymerization (ATRP) initiator, yielding a mechanochromic polymerization initiator, which is suitable for incorporation into a polymeric network. Non-limiting examples of suitable halogen-functional acyl halide are 2-bromopropionyl bromide and 2-bromoisobutyryl bromide.

The resulting mechanochromic initiator may then be used to polymerize (meth)acrylates in an ATRP process, such as described in U.S. Pat. No. 6,441,066B1, incorporated herein by reference. As used herein, and as is conventional in the art, "meth(acrylate)" refers to both acrylate and the corresponding methacrylate. The mechanochromic (meth)acrylic polymer is hydroxy-functional, which is then reacted with a polyisocyanate, such as methylene diphenyl diisocyanate (MDI), toluene diisocyanate (TDI), hexamethylene diisocyanate (HDI), and isophorone diisocyanate (IPDI), resulting in a mechanochromic (meth)acrylic polyisocyanate. Finally, the mechanochromic (meth)acrylic polyisocyanate is reacted with a polyol to yield a urethane acrylate polymeric network. In this manner, the (meth)acrylic polymer containing the mechanophore can be incorporated into a urethane network at a desired concentration of mechanophore within the urethane network. As detailed below, it should be appreciated that the amount of mechanophore included in the polymeric network may be readily adjusted by selecting the relative amounts of mechanochromic and non-mechanochromic (meth)acrylic polymer incorporated into the polyurethane network.

The polyurethane network incorporating a mechanophore according to the present invention includes urethane acrylate that is polymerized by a photoinitiator initiating reactions, thereby providing a coating having sufficient toughness and adhesion to substrates for use as a damage reporting coating. The urethane acrylate polymer network may be a hard-type polymer or a soft-type polymer depending on the type and consumed amount of a polyisocyanate functional group and a polyol. For example, a soft-type polyurethane network may be produced using a polyisocyanate functional group that is a single functional group and a hard-type polymeric network may result when the polyisocyanate functional group is a tri-functional group. In addition, the greater the amount of polyester polyol used in producing the polymeric network the resulting urethane acrylate polymer has softer characteristics, whereas an increased amount of polyester polyol renders the urethane acrylate polymer closer in characteristics to a hard-type polymer. In this manner, the type of polyisocyanate and the amount of polyester polyol may be controlled in order to select properties, such as abrasion resistance, scratch resistance, adhesion, stain resistance, and the like. Examples of methacrylate monomers that are suitable for use in the present invention include esters of acrylic and methacrylic acid, such as methyl (meth)acrylate, ethyl (meth)acrylate, propyl (meth)acrylate, isopropyl (meth)acrylate, butyl (meth)acrylate, isobutyl (meth)acrylate, tertiary butyl (meth)acrylate, neopentyl (meth)acrylate, isopentyl (meth)acrylate, n-hexyl (meth)acrylate, isohexyl (meth)acrylate, n-heptyl (meth)acrylate, iso-heptyl (meth)acrylate, octyl (meth)acrylate, iso-octyl (meth)acrylate, 2-ethylhexyl (meth)acrylate, nonyl (meth)acrylate, iso-nonyl (meth)acrylate, decyl (meth)acrylate, iso-decyl (meth)acrylate, undecyl (meth)acrylate, iso-undecyl (meth)acrylate, dodecyl (meth)acrylate, iso-dodecyl (meth)acrylate, tridecyl (meth)acrylate, iso-tridecyl (meth)acrylate, tetradecyl (meth)acrylate, iso-tetradecyl (meth)acrylate, and mixtures thereof.

In certain embodiments, the polymeric network may comprise multi-functional (meth)acrylate monomers and/or polymers, such as di-functional, tri-functional, tetra and/or higher functional (meth)acrylates.

In certain embodiments, the polymeric network of the present invention is provided in a coating composition that includes other optional components, such as those well known in the art of formulating surface coatings. Such optional components may include, for example, surface active agents, flow control agents, thixotropic agents, anti-gassing agents, antioxidants, light stabilizers, UV absorbers, and other customary auxiliaries. Any such additives known in the art can be used, absent compatibility issues.

In certain embodiments, the coating composition of the present invention may include a colorant. As used herein, the term "colorant" means any substance that imparts color and/or other opacity and/or other visual effect to the composition. The colorant can be included to the coating composition in any suitable form, such as discrete particles, dispersions, solutions, and/or flakes. A single colorant or a mixture of two or more colorants can be used in the coatings of the present invention. It should be understood that the inclusion of colorants in the coating composition of the present invention may contrast or compliment the color change that is exhibited by the mechanophore included in the polymeric network of the present invention.

Example colorants include pigments, dyes, and tints, such as those used in the paint industry and/or listed in the Dry Color Manufacturers Association (DCMA), as well as special-effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based, such as pthalo green or blue, iron oxide, bismuth vanadate, anthraquinone, perylene, aluminum, and quinacridone.

Example tints include, but are not limited to, pigments dispersed in water-based or water-miscible carriers, such as AQUA-CHEM 896 commercially available from Degussa, Inc., CHARISMA COLORANTS and MAXITONER INDUSTRIAL COLORANTS commercially available from Accurate Dispersions, a division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discrete "composite microparticles" that comprise a nanoparticle and a resin coating on the nanoparticle. Example dispersions of resin-coated nanoparticles and methods for making them are identified in U.S. Pat. No. 7,438,972 and U.S. Pat. No. 7,605,194, which are incorporated herein by reference.

Example special effect compositions that may be used in the compositions of the present invention include pigments and/or compositions that produce one or more appearance effects, in addition to the mechanochromic effect, such as reflectance, pearlescence, metallic sheen, phosphorescence, fluorescence, photochromism, photosensitivity, thermochromism, goniochromism, and/or color-change. Additional special-effect compositions can provide other perceptible properties, such as opacity or texture. In a non-limiting embodiment, special-effect compositions can produce a color shift, such that the color of the coating changes when the coating is viewed at different angles. Example color-effect compositions are identified in U.S. Pat. No. 6,894,086, incorporated herein by reference. Additional color-effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions of the present invention.

The coating compositions of the present invention can be prepared by any suitable technique, including those described in the Examples herein. The coating components can be mixed using, for example, stirred tanks, dissolvers including inline dissolvers, bead mills, stirrer mills, static mixers, among others. Where appropriate, it is carried out with exclusion of actinic radiation in order to prevent damage to the coating of the invention, which is curable with actinic radiation. In the course of preparation, the individual constituents of the mixture according to the invention can be incorporated separately. Alternatively, the mixture of the invention can be prepared separately and mixed with the other constituents.

The following Examples are presented to demonstrate the general principles of the invention. The invention should not be considered as limited to the specific Examples presented. All parts are by weight unless otherwise indicated.

EXAMPLES

Example 1

An indenonaphthopyran-based polymerization initiator was prepared as follows. The dye having structural formula I was added into a 2 oz. jar flushed with nitrogen in an equivalents ratio of dye (0.56 g, 1 equiv), triethylamine (0.28 g, 3.1 equiv), and $CH_2Cl_2$ (11.7 g, 3 mL/g dye). This mixture was cooled in a dry ice/ethanol bath, and a solution of 2-bromopropionyl bromide (0.58 g, 3 equiv) in $CH_2Cl_2$ (1-2 g, ~4 mL/g bromide) was added. The jar was resealed and allowed to warm to room temperature. After stirring for 18 hours, the reaction was diluted with 10 mL of water. The layers were separated, and the aqueous layer was extracted with $CH_2Cl_2$. The combined organics were washed with saturated bicarbonate, dried over $MgSO_4$, and concentrated under vacuum. The residue was filtered through a plug of silica, eluted with $CH_2Cl_2$, and yielded an indenonaphthopyran dye functionalized with an ATRP initiator at the 13 carbon and para positions, as shown in structural formula II, referred to herein as initiator INP-13,p.

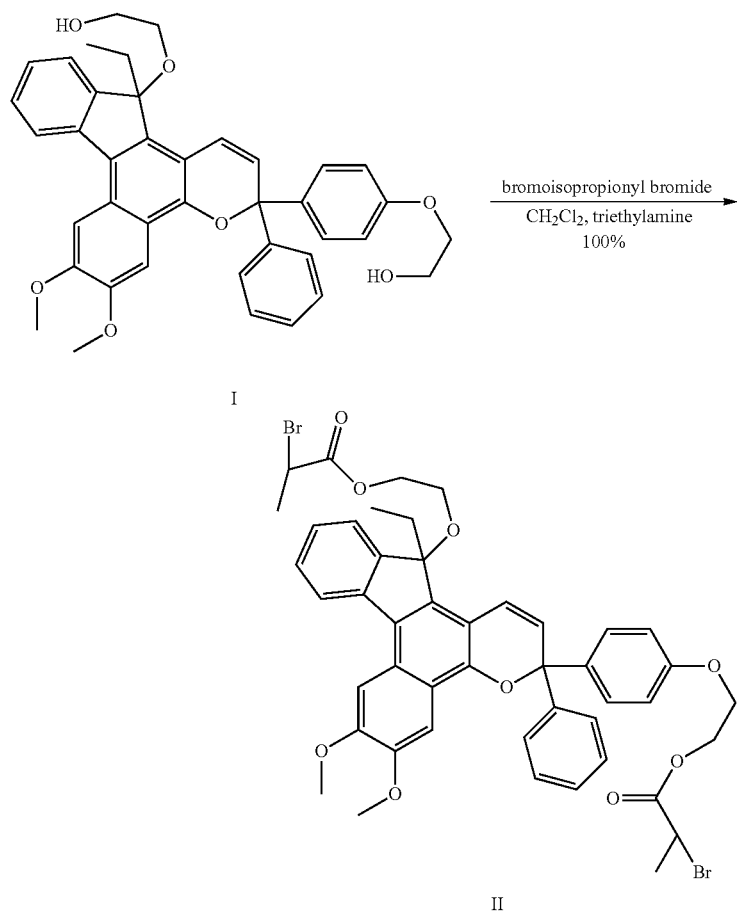

I

II

Example 2

A (meth)acrylic polymer was produced using the indenon-aphthopyran-based initiator of Example 1. The initiator of Example 1 (0.1 g, 1 equiv) was charged into a flask placed in a room temperature water bath along with copper metal (0.03 g, 4 equivs), tris[2-(dimethylamino)ethyl]amine (Me6TREN) ligand (0.1 g, 4 equivs), and dry dimethyl sulfoxide (DMSO) (10.65 mL). The resulting mixture was purged with dry nitrogen for 20 minutes. Methyl acrylate (20.65 g, 2248 equivs) was filtered through a plug of alumina and purged with nitrogen for 20 minutes, then added to the flask. The mixture was allowed to stir overnight, and a significant increase in viscosity was observed. The material was dissolved in tetrahydrofuran and stirred open to the atmosphere for 5 minutes, at which time the viscous solution was filtered. The polymer was purified by precipitation into methanol. The resultant white (meth)acrylic polymer was reversibly photochromic under UV radiation.

Example 3

A spirooxazine-based initiator was prepared as follows. The dye (1-nitroso-2,3-dihydroxynaphthalene) was prepared according to Dyes and Pigments 2002, 53, 101. The hydroxyl indole salt of the dye was prepared according to J. Am. Chem. Soc. 2007, 129, 13808. A solution of 1-nitroso-2,3-dihydroxynaphthalene (structure III) (0.53 g, 0.275 mmol) in 13.75 mL of 1,2-dichloroethane was placed in a round bottomed flask and warmed to reflux, and then a mixture of hydroxyl indole salt (0.84 g, 0.275 mmol) and triethylamine (0.56 g, 0.55 mmol) was added dropwise. The resulting dark solution was refluxed for 1 hour, then cooled, and a blue product was collected via filtration. This product was taken back up in $CH_2Cl_2$ and functionalized with 2-bromopropionyl bromide at the 5 carbon and 5' carbon positions as described in Example 1, resulting in the spirooxazine-based initiator of structure IV, referred to herein as initiator SPO-5,5'.

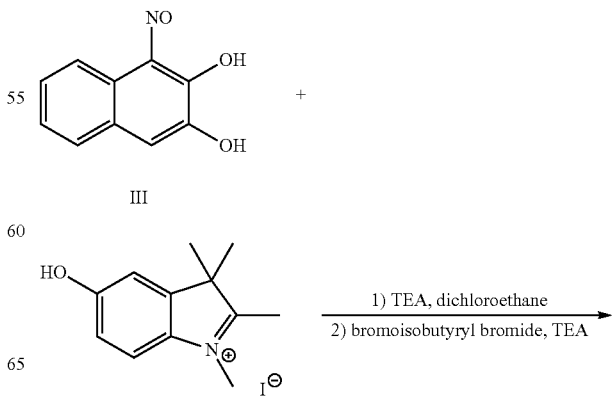

III

-continued

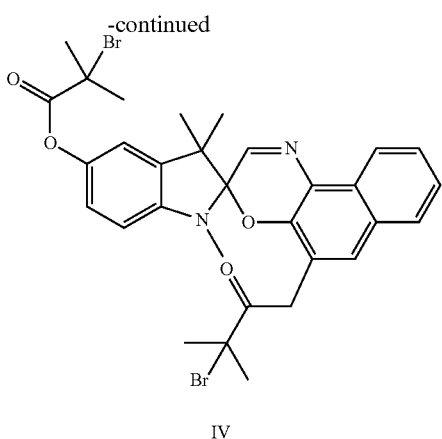

IV

Example 4

Example 2 was repeated except the spirooxazine-based initiator of Example 3 was used in place of the indenonaphthopyran-based initiator at a weight ratio of 2.3:9.21:1 of hydroxypropyl acrylate to methyl acrylate to initiator. Gel permeation chromatography (GPC) analysis indicated a peak molecular weight of 6707. The polymer was found to be reversibly photochromic under UV irradiation.

Example 5

An indenonaphthopyran-based initiator was prepared as follows. In a first step, the dye of structure V (0.1323 g, 1 equiv) was placed in a 20 mL scintillation vial with dicyclohexylcarbodiimide (DCC, 0.044 g, 1.05 equivs), ethylene glycol (0.57 g, 45 equivs), dimethylaminopyridine (0.0013 g, 0.05 equivs), and $CH_2Cl_2$ (3.2 mL). The resulting solution was stirred at room temperature for 3 hours, at which time thin layer chromatography analysis indicated complete consumption of starting material. The reaction was partitioned between $CH_2Cl_2$ and water, and the layers were separated. The organic layer was washed with water, dried over sodium sulfate and concentrated, yielding a green solid. In a second step, the solid was reacted at the 11 carbon and para positions with initiator according to the process of Example 1, yielding the indenonaphthopyran-based initiator of structure VI, referred to herein as initiator INP-11,p.

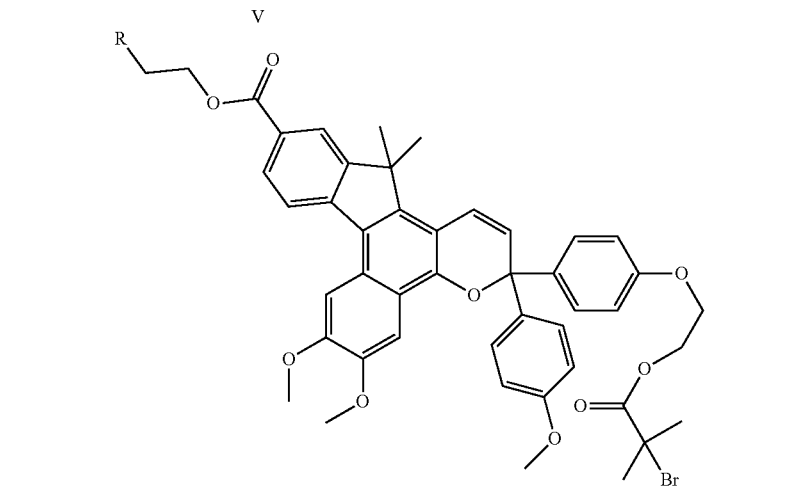

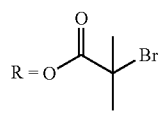

Example 6

Example 2 was repeated except the indenonaphthopyran-based initiator of Example 5 was used in place of the material from Example 1 at a weight ratio of 143:1 of methyl acrylate to initiator. GPC indicated a peak MW of 128,000.

Example 7

An indenonaphthopyran-based initiator (structure VIII), referred to herein as initiator INP-7,p, was prepared from the dye of structure VII according to the procedure of Example 1 using bromoisobutyryl bromide, reacting at the 7 carbon and para positions.

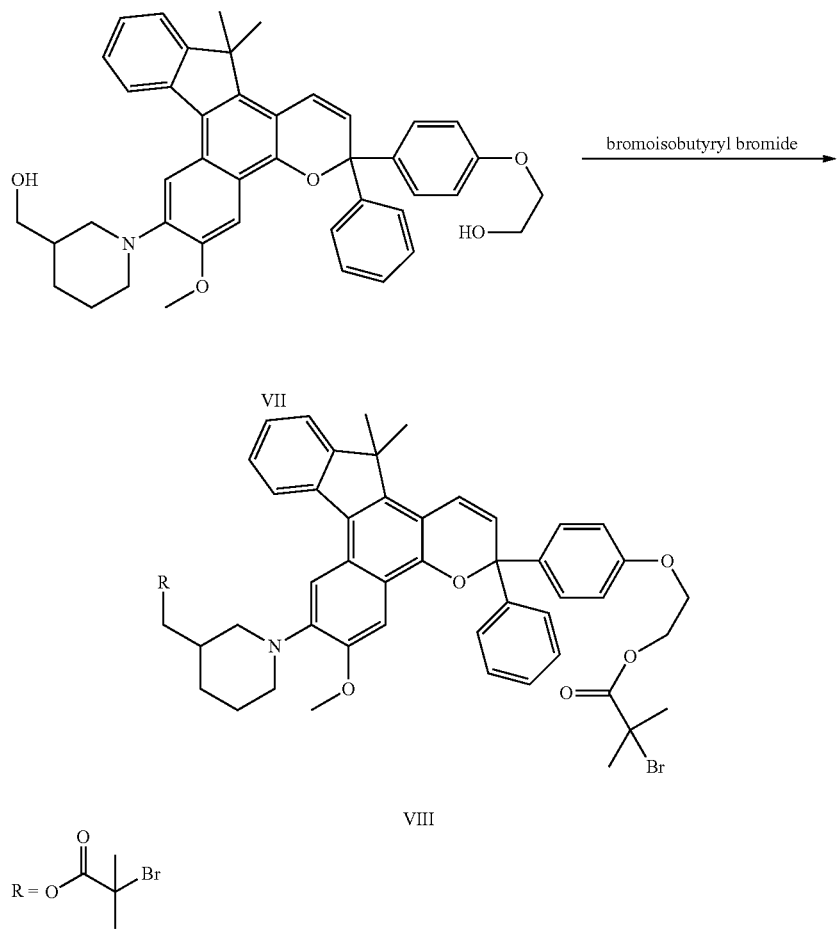

Example 8

Example 2 was repeated except the indenonaphthopyran-based initiator of Example 7 was used in place of the material from Example 1 at a weight ratio of 143:1 of methyl acrylate to initiator. GPC indicated a peak MW of 163,569.

Example 9

Example 4 was repeated except using a 143:1 ratio of methyl acrylate to initiator. GPC indicated a peak MW of 183,118.

Example 10

The acrylic polymers from Examples 2, 6, 8, and 9 were evaluated for being mechanochromic by computational methods by evaluating the bond energy change upon elongation of the dye molecule at the locations of bonding to the acrylic polymers. Based on that modeling, as reported in Table 1, initiators INP-7,p and SPO-5,5' were expected to be mechanochromic in use.

The acrylic polymers were evaluated for photochromic and mechanochromic activity. A small amount of each material was taken up in methylene chloride, placed on a wooden tongue depressor, and allowed to evaporate for 30 minutes.

Photochromic activity was evaluated by irradiating with a UV light. Reversible photochromism was observed for all polymers. Mechanochromic behavior was evaluated by rubbing the polymer with a second wooden tongue depressor. As can be seen in Table 1, by comparing Examples 2 and 6 with Example 8, mechanochromic activity only occurred when the substituent pattern of the initiator on the dye was in specific locations in order to weaken the active bond in the mechanophore. For indenonaphthopyrans having the general structure of an indeno portion, a naphtho portion, and a pyran portion, it was found that binding to the polymer at the 7 carbon and at the para position on the pyran resulted in mechanochromism. For spirooxazine, having a general structure of an indolene portion and a naphthalene portion, binding at the C5 of the indolene portion and C5' of the naphthalene portion resulted in mechanochromism. Other pairs of binding sites may also result in mechanochromism.

TABLE 1

| Example | Initiator | Predicted to be mechanically active | UV active (photochromic) | Mechanically active |
|---|---|---|---|---|
| 2 | INP-13,p | not evaluated | y | n |
| 6 | INP-11,p | n | y | n |
| 8 | INP-7,p | y | y | y (very weak) |
| 9 | SPO-5,5' | y | y | y |

Example 11

A coating composition was prepared as follows. The following components were used to prepare Pre-Mixture A of a mechanochromic acrylic polyisocyanate:

| Pre-Mixture A | |
|---|---|
| Component | Parts by weight |
| Polyfunctional isocyanate* | 5.07 |
| Polymer from Example 4 (SPO-5,5') | 1.34 |
| Butyl acetate | 0.93 |
| Methylene chloride | 2.23 |

*CA8000B, commercially available polyfunctional isocyanate from PPG Aerospace PRC-Desoto Butyl acetate was added to the mechanochromic polymer prepared in Example 4 and mixed on a magnetic stir plate. Once incorporated, the polyisocyanate was added and gel formation was observed. Methylene chloride was added and allowed to mix on a magnetic stir plate in a closed vessel for 24 hours. After 24 hours, the mixture was formulated into the final coating. Some of the gelled material dissolved into solution.

The following components were used to prepare a coating composition:

| Coating Composition | |
|---|---|
| Component | Parts by weight |
| Polyol* | 7.25 |
| Pre-Mixture A (mechanochromic acrylic polyisocyanate) | 6.72 |

*CA8000/B900A, commercially available polyol from PPG Aerospace PRC-Desoto

The coating was prepared by mixing the polyol with Pre-Mixture A for 30 minutes on a magnetic stir plate. The coating composition was applied over a test panel. The test panel was produced from a 0.032" cold rolled steel substrate commercially available from ACT Test Panel Technologies, lightly scuffed abraded using ultra fine Scotch-Brite commercially available from 3M followed by solvent wipe with isopropanol alcohol and allowed to air dry. A topcoat of Desothane® HS Topcoat CA8000/B7067 (commercially available from PPG Aerospace PRC-Desoto) was prepared according to the manufacturer's technical data sheet and applied over the panel using a wire wound drawdown bar from R.D. Specialties to a dry film thickness of 2-4 mils. The drawn down coating was allowed to cure at room temperature and humidity for 7 days. The cured panel had an overall dry film thickness of approximately 3.8 mils, of which approximately 1.25 mils was the topcoat and 2.5 mils clear coat.

The cured film exhibited a slight yellow color. After exposure to long wave UV light using a UVP model UVGL-25 hand held UV lamp the panel exhibited a blue color shift. Upon removal of UV light, blue color faded back to yellow over a period of approximately 1 hour.

Physical deformation of the coating was performed using a BYK Gardner Impact tester at 50 in./lb. and 100 in./lb. with a 0.625" pin or conical mandrel. No color shift of the coating was exhibited.

Comparative Example 12

Three control hydroxy-functional poly(meth)acrylate coatings were prepared according to the conditions described in Example 2 at the following weight ratios. The molecular weights of the polymers are not listed, which were not found to be photochromic under UV irradiation.

| Control hydroxy-functional poly(meth)acrylate compositions | | | | |
|---|---|---|---|---|
| | Weight ratio of components | | | |
| Polymer | hydroxypropyl acrylate | methyl acrylate | dimethyl-2,6-dibromoheptanedioate | Mw |
| A | 11.9 | 9.73 | 1 | 3705 |
| B | 6.52 | 15.22 | 1 | 4907 |
| C | 4.39 | 17.54 | 1 | 4109 |

Example 13

Coating compositions were prepared as follows. The following components were used to prepare Mixtures B, C, D, and E acrylic polyisocyanate.

| Component | Mixture B Parts by weight | Mixture C Parts by weight | Mixture D Parts by weight | Mixture E Parts by weight |
|---|---|---|---|---|
| Polyfunctional isocyanate* | 0.702 | 2.91 | 0.640 | 3.023 |
| Polymer A from Example 12 | 0.185 | | | |
| Polymer from Example 4 | | 0.900 | | |
| Polymer B from Example 12 | | | 0.188 | |
| Acetone | 0.926 | 1.000 | 1.013 | 1.482 |

*CA8000B

For each formulation, the acetone was added to the polymer and mixed on a magnetic stir plate. Once incorporated, the isocyanate was added and allowed to mix on a magnetic stir plate, in a closed vessel.

Mixtures B and D exhibited gel formation after the addition of the isocyanate, Mixture B within 5 minutes and Mixture D within 72 hours. No final coatings were formulated from these mixtures. Mixtures C and E did not exhibit any gelling and were further formulated into coating compositions using the following components.

| Coating Compositions | | |
|---|---|---|
| Component | Coating 1 Parts by weight | Coating 2 Parts by weight |
| Polyol* | 4.260 | 4.884 |
| Mixture C | 4.81 | |
| Mixture E | | 4.505 |

*CA8000/B900A

The final coatings were prepared by mixing the polyol with the respective mixtures C and E. Each formulated coating was allowed to mix for 30 minutes on a magnetic stir plate. Following the 30 minute induction period, the coating was applied over a coated test panel prepared as in Example 11.

Physical deformation of the coatings was performed using a BYK Gardner Impact tester and Elcometer 3000 Clemen scratch tester. The results are reported in Table 2.

TABLE 2

| Test method | Coating 1 | Coating 2 |
| --- | --- | --- |
| Impact 0.625" pin 50 in/lbs | No color shift | No color shift |
| Impact 0.625" pin 100 in/lbs | No color shift | No color shift |
| Impact 0.625" pin 160 in/lbs | Blue color shift color fades back to clear within 1 hour | No color shift |
| Clemen scratch test 1200 grams | No color shift | No color shift |
| Clemen scratch test 2400 grams | Blue color shift Color fades back to clear within 1 hour | No color shift |

It should be appreciated that the mechanochromic coating composition of the present invention includes a polymeric network incorporating a plurality of ring-opening mechanophores. The mechanophores may be distributed throughout the network at various concentrations, depending upon the concentration of the mechanochromic (meth)acrylic polymer used therein. As such, the amount of mechanophore incorporated at the molecular level into the polymeric network can be adjusted based on the amount of (meth)acrylic polymer that incorporates the mechanophore relative to the amount of (meth)acrylic polymer without a mechanophore therein.

In addition, the color change of the material may be apparent in a coating composition that contains a colorant or one that does not contain a colorant. The energy required to obtain a color change in the material is provided by the force applied to the material. In a situation where the material does not contain a colorant, a force may exhibit color in an otherwise uncolored coating. Such a color may only be detectable upon application of a predetermined or sufficient load. For example, a load that is below a threshold amount for a particular component may not exhibit a color. However, when the threshold load is exceeded, the color becomes evident. For a colored coating composition, the force may result in a color change or shift when the material is sufficiently stressed. In addition, the color change may be reversible or may have an extended lifetime. For example, in certain applications, it may be desirable to have a color shift that lasts the lifetime of the component as an indication that the component had received a certain amount of stresses over its lifetime.

Although the present invention has been described with reference to specific details of certain embodiments thereof, it is not intended that such details should be regarded as limitations upon the scope of the invention except insofar as they are included in the accompanying claims.

The invention claimed is:

1. A mechanochromic coating composition comprising a polymeric network incorporating a plurality of ring-opening mechanophores each bound at two positions thereof within said polymeric network, wherein said mechanophore comprises spirooxazine and/or indenonaphthopyran.

2. The mechanochromic coating composition of claim 1, wherein said polymeric network comprises polyurethane.

3. The mechanochromic coating composition of claim 1, wherein said spirooxazine comprises an indolene portion and a naphthalene portion.

4. The mechanochromic coating composition of claim 3, wherein said spirooxazine is bound within said polymeric network at the C5 position of said indolene portion and the C5' position of the naphthalene portion of said spirooxazine.

5. The mechanochromic coating composition of claim 1, wherein said indenonaphthopyran comprises an indeno portion, a naphtho portion, and a pyran portion, and includes a substituent on the pyran portion.

6. The mechanochromic coating composition of claim 5, wherein said indenonaphthopyran is bound within said polymeric network at said pyran portion substituent and at said naphtho portion of said indenonaphthopyran.

7. The mechanochromic coating composition of claim 6, wherein said indenonaphthopyran is bound within said polymeric network at the C7 position of said indenonaphthopyran.

8. A method of determining whether a mechanical load has been applied to an article comprising:
coating an article with the mechanochromic coating composition of claim 1; and
detecting a color change of the coating composition, the color change indicating that the coating composition has been subjected to a mechanical load.

9. The method of claim 8, wherein the color change occurs upon the article receiving a mechanical load in excess of a predetermined level.

10. The method of claim 8, wherein the polymeric network comprises polyurethane.

11. A method of making a mechanochromic coating composition comprising:
preparing a curable composition comprising polyurethane precursor components and a ring-opening mechanophore; and
reacting said polyurethane precursor components and said mechanophore, such that said mechanophore is bound at two locations thereof to said polyurethane precursors, thereby producing a polyurethane network having said mechanophore incorporated therein, wherein said mechanophore comprises spirooxazine and/or indenonaphthopyran.

12. The method of claim 11, wherein said spirooxazine comprises an indolene portion and a naphthalene portion.

13. The method of claim 12, wherein said spirooxazine is bound within said polymeric network at the C5 position of said indolene portion and the C5' position of the naphthalene portion of said spirooxazine.

14. The method of claim 11, wherein said indenonaphthopyran comprises an indeno portion, a naphtho portion, and a pyran portion, and includes substituents on the pyran portion.

15. The method of claim 14, wherein indenonaphthopyran is bound within said polymeric network at said pyran portion substituents and at said naphtho portion of said indenonaphthopyran.

16. The method of claim 15, wherein said indenonaphthopyran is bound within said polymeric network at the C7 position of said indenonaphthopyran.

* * * * *